(12) United States Patent
Genz et al.

(10) Patent No.: US 10,493,589 B2
(45) Date of Patent: Dec. 3, 2019

(54) APPARATUS FOR SHORTENING THE ROTOR BLADES OF A TURBOMACHINE

(71) Applicant: Siemens Aktiengesellschaft, München (DE)

(72) Inventors: Alexander Genz, Zepernick (DE); Samuel Liedtke, Oranienburg (DE); Florian Lohse, Berlin (DE)

(73) Assignee: SIEMENS AKTIENGESELLSCHAFT (DE)

( * ) Notice: Subject to any disclaimer, the term of this patent is extended or adjusted under 35 U.S.C. 154(b) by 14 days.

(21) Appl. No.: 16/163,148

(22) Filed: Oct. 17, 2018

(65) Prior Publication Data

US 2019/0047108 A1 Feb. 14, 2019

Related U.S. Application Data

(60) Continuation of application No. 15/476,348, filed on Mar. 31, 2017, which is a division of application No.
(Continued)

(30) Foreign Application Priority Data

Oct. 24, 2013 (EP) .................................... 13189998

(51) Int. Cl.
*B24B 21/16* (2006.01)
*B24B 55/10* (2006.01)
(Continued)

(52) U.S. Cl.
CPC ........ *B24B 21/165* (2013.01); *B23Q 11/0046* (2013.01); *B24B 55/107* (2013.01);
(Continued)

(58) Field of Classification Search
CPC ....... B24B 21/165; B24B 55/107; F01D 5/18; F05D 2230/10; F05D 2240/307
(Continued)

(56) References Cited

U.S. PATENT DOCUMENTS

| 1,939,674 A | 12/1933 | Elskamp |
|---|---|---|
| 1,978,037 A | 10/1934 | Yates |

(Continued)

FOREIGN PATENT DOCUMENTS

| EP | 0483064 | 4/1992 |
|---|---|---|
| FR | 2629747 | 10/1989 |

(Continued)

OTHER PUBLICATIONS

European Search Report and Opinion dated Feb. 23, 2016 in corresponding European Patent Application No. 15003145.8 (5 pages).

(Continued)

*Primary Examiner* — Joseph J Hail
*Assistant Examiner* — J Stephen Taylor
(74) *Attorney, Agent, or Firm* — Ostrolenk Faber LLP

(57) ABSTRACT

A belt grinding apparatus for grinding the tips of rotor blades is supported on a rotating rotor. A casing contains the rotatable rotor. An opening in the casing permits access of a grinding belt into the casing where the belt grinds the tips of the blades rotating past. The belt grinding apparatus is attached at the opening at a parting line in the casing.

9 Claims, 3 Drawing Sheets

Related U.S. Application Data

14/518,296, filed on Oct. 20, 2014, now Pat. No. 9,616,543.

(51) Int. Cl.
   *B24B 55/08* (2006.01)
   *B23Q 11/00* (2006.01)
   *F01D 5/18* (2006.01)

(52) U.S. Cl.
   CPC ............... *B24B 55/08* (2013.01); *B24B 55/10* (2013.01); *F01D 5/18* (2013.01); *F05D 2230/10* (2013.01); *F05D 2240/307* (2013.01); *Y02P 70/171* (2015.11)

(58) Field of Classification Search
   USPC .......................................................... 451/59
   See application file for complete search history.

(56) References Cited

U.S. PATENT DOCUMENTS

| | | | |
|---|---|---|---|
| 2,830,410 A | 4/1958 | Stieglitz | |
| 3,965,623 A | 6/1976 | Grutza et al. | 51/281 R |
| 4,309,848 A * | 1/1982 | Arrigoni | B23P 6/002 451/125 |
| 4,512,115 A | 4/1985 | Miller | 51/289 R |
| 4,805,282 A * | 2/1989 | Reaves | B24B 5/363 29/889.1 |
| 5,152,058 A | 10/1992 | Legros | 29/889.1 |
| 5,245,792 A | 9/1993 | Liechti et al. | 51/165 R |
| 5,371,973 A | 12/1994 | Kaiser, Jr. et al. | 451/62 |
| 5,704,826 A | 1/1998 | De Luis Vizcaino | 451/242 |
| 7,032,279 B2 | 4/2006 | McCarvill et al. | 29/90.01 |
| 7,125,312 B2 * | 10/2006 | Castanares | B24B 5/36 451/5 |
| 8,181,555 B2 * | 5/2012 | Clements | B23B 29/03489 82/70.2 |
| 9,085,053 B2 | 7/2015 | Tholen et al. | 415/108 |
| 2004/0074093 A1 | 4/2004 | McCarvill et al. | 29/888.021 |
| 2005/0048883 A1 * | 3/2005 | Melvin | B24B 23/06 451/355 |
| 2008/0005904 A1 | 1/2008 | Orobengoa Ortubay et al. | 29/889.23 |
| 2009/0113683 A1 | 5/2009 | Secherling | 29/23.51 |
| 2010/0202841 A1 | 8/2010 | Backhouse | 408/3 |
| 2012/0077417 A1 | 3/2012 | Derrien et al. | 451/5 |

FOREIGN PATENT DOCUMENTS

| | | |
|---|---|---|
| JP | S59-205264 | 11/1984 |
| RU | 2 116 880 C1 | 8/1998 |

OTHER PUBLICATIONS

European Search Report and Opinion dated Mar. 17, 2014 in corresponding European Patent Application No. 13189998.1 (6 pages).

Russian Office Action dated May 25, 2018 in corresponding Russian Patent Application No. 2014139281.

* cited by examiner

APPARATUS FOR SHORTENING THE ROTOR BLADES OF A TURBOMACHINE

CROSS-REFERENCE TO RELATED APPLICATIONS

The present application is a continuation of U.S. patent application Ser. No. 15/476,348, filed Mar. 31, 2017, which is a divisional of U.S. patent application Ser. No. 14/518,296, filed Oct. 20, 2014, now U.S. Pat. No. 9,616,543, which claims priority to European Patent Application No. EP 13189998.1, filed Oct. 24, 2013. The entire contents of each of these patent applications are incorporated herein by reference.

TECHNICAL FIELD

The present invention relates to a method for shortening the rotor blades of a turbomachine by removal of material at the blade tip, and to apparatuses for carrying out such a method.

TECHNICAL BACKGROUND

During operation, blades of turbomachines, in particular turbine blades, are subjected to very high material loading and to corresponding high wear. For this reason, the blades are replaced with new blades within the framework of maintenance work, normally after a predetermined operating time. In that context, the operating time is advantageously chosen such that the replaced blades may still be repaired.

If the blades of a turbine are replaced, the turbine rotor blades, the turbine stator vanes and the guiding segments are replaced. In order to be able to ensure, in the context of such a replacement, that the original turbine power is maintained, the original radial blade gap width must be set also for the new turbine rotor blades. To that end, the blade tips of the new rotor blades are accordingly shortened, before they are mounted, by removal of material at the blade tip. Since the radial gap width depends not only on the manufacturing tolerances of the new rotor blades but also on other factors, the final radial blade gap results only after the completed replacement of all blades. Influential factors may for example be the contour of the new stator vanes, the contour of the new guiding rings, the coating of the new stator vanes and guiding rings, the change in position of the new blades relative to the position of the replaced old blades, the manufacturing tolerances of the casing, the rotor disk slots and the like. The gap width which is finally set is accordingly difficult to calculate in advance and this can be done only within a very broad tolerance range.

Shortening the blade tips of rotor blades is normally carried out within the framework of a grinding machining using a grinding disk.

When building new rotors, it is known to clamp the entire bladed rotor in a large grinding machine, whereupon the blades are ground entirely automatically to the required length with a straight grinding disk.

Within the context of maintenance work, it is known to remove the rotor of a turbomachine in a first step. In a further step, the rotor disks as a whole may then be clamped in a grinding apparatus. A high-speed rotor with a straight grinding disk is attached thereto on an arm which rotates about the blade tips. In that context, an automatic feed in two directions and manual travel are carried out.

It is further known to grind blades individually. To that end, the blades are clamped individually in a grinding apparatus which carries a pneumatic high-speed rotor with a straight grinding disk. The high-speed rotor oscillates about the blade tip and has, in addition to the oscillatory movement, an automatic feed and a manual travel.

Another alternative consists in milling the blade tips for shortening purposes. In the CNC milling machines used for this, the blades are clamped individually and are milled to the required length.

One disadvantage of the grinding apparatuses with a straight grinding disk, used to shorten rotor blades, is that on account of the limited width of the grinding disk, which is approximately 20 mm in mobile use, it is necessary to move the grinding disk along the contour of the blade tip. Accordingly, an automatic feed is necessary, which leads to a complex construction of the grinding apparatus and to high costs. Furthermore, a long machining time is associated with the automatic feed.

One disadvantage of the milling methods used to shorten rotor blades of a turbomachine is, on one hand, that these are very expensive, which is not least due to the high initial costs of the CNC milling machines used and the high tool costs. On the other hand, the milling methods are very slow. Thus, for example, in practice 12 layers at 10 hours are needed to machine four turbine stages, to name but one example.

SUMMARY OF THE INVENTION

Proceeding from this prior art, it is an object of the present invention to provide a method for shortening a rotor blade of a turbomachine of the type mentioned in the introduction and apparatus for carrying out such a method, by means of which rotor blades can be shortened cost-effectively and quickly. Preferably the grinding step gives the blade tip a conical contour and relative movement of the belt grinding apparatus and the blade tips are adjusted during grinding to shape the blade tip.

The present invention achieves this object by providing a method for shortening the rotor blades of a turbomachine by removal of material at the blade tip, in which according to the invention a belt grinding apparatus is used to shorten the rotor blade. An essential advantage of using a belt grinding apparatus is that, by using a grinding belt which is wider than the blade tip to be shortened, the entire blade tip can be machined in one pass. Accordingly, in contrast to grinding machining with a grinding disk and in contrast to milling machining, it is not necessary to move the grinding belt along the contour of the blade tip, which results in a compact, lightweight and cost-effective construction. In addition, the machining time is reduced. According to the first estimates of the applicant, it is possible to achieve a time saving of approximately 60% with respect to grinding with a straight grinding disk and even of 80 to 90% with respect to milling machining. The higher costs for the grinding belts with respect to a straight grinding disk are compensated for by markedly shorter machining times. This is also the case for the shorter downtimes of grinding belts in comparison with grinding disks and milling cutters. A further advantage of using a belt grinding apparatus is that grinding belts are not as susceptible to transport damage as straight grinding disks and milling cutters. Furthermore, tests have shown that, when using a belt grinding apparatus, there is no risk of the ceramic coating of the blades breaking off. In addition, grinding machining with a grinding belt generates no or almost no burrs, which has the advantage that no or only limited manual post-treatments need be carried out. Yet a further advantage is that with the reduced machining time also comes a reduced hazard period for staff.

According to a first configuration of the method according to the invention, the rotor blades remain installed in a casing of the turbomachine during the shortening, wherein the method has the steps of: removing a casing part, at least partially exposing the rotor blades to be machined and exposing a parting joint of the casing; attaching a belt grinding apparatus to the parting joint of the casing in the region of the rotor blades to be machined; orienting the belt grinding apparatus relative to the rotor blades to be shortened and shortening the rotor blades in situ using the belt grinding apparatus while the rotor is continuously rotated and the grinding dust produced during the grinding machining is extracted. This method variant is in particular characterized in that the rotor blades need not be removed, implying little effort, a significant time saving and low costs. Furthermore, by machining the blades in the installed state, all the tolerance chains for producing an intended blade gap are automatically taken into account, which leads to an optimum machining result.

Preferably, cooling air bores of the blades to be shortened are sealed or covered before the grinding machining is carried out. The sealing can for example be carried out using wax. Wax is in particular noteworthy in that it has a low melting point and is automatically evaporated and thus removed when the turbine is started up. Alternatively, however, the cooling air bores may be sealed, for example using a suitable adhesive film or the like.

An auxiliary rotor rotating device, which is known in principle in the prior art and need therefore not be described in more detail here, is preferably used to continuously rotate the rotor.

A further variant of the method according to the invention has the steps of: removing, from the turbomachine, a rotor blade to be shortened; attaching the rotor blade to a quick-release device of a belt grinding apparatus, which is configured to receive the rotor blade; orienting a grinding belt of the belt grinding apparatus relative to the rotor blade and shortening the rotor blade using the belt grinding apparatus while the quick-release device, together with the rotor blade attached thereto, is pivoted about a pivot axis. With this method variant according to the invention, rotor blades are therefore machined individually in the uninstalled state.

A further variant of the method according to the invention has the steps of: attaching the rotor blades to a dummy rotor disk, in this context every rotor blade is fixed both radially and axially in the slot by means of threaded bolts; arranging the dummy rotor disk with the rotor blades held thereon on a rotating device which is configured to rotate the dummy rotor disk about its axis of rotation; orienting the belt grinding apparatus relative to the rotor blades to be shortened and shortening the rotor blades using the belt grinding apparatus while the dummy rotor disk is continuously rotated.

A further variant of the method according to the invention has the steps of: clamping the bladed rotor in a rotating machine corresponding to the procedure when grinding a new-build rotor; inserting sheet metal strips into the gap between the blade root and the base of the slot in order to avoid the blades wobbling and to press these outward as in operation; orienting a grinding belt of the belt grinding apparatus relative to the rotor blades of a blade row and shortening the rotor blade using the belt grinding apparatus while the rotor rotates slowly in the rotating machine. The difference between this method variant according to the invention and the previously used method of grinding a new-build rotor lies in the use of a belt grinder instead of the straight grinding disk used previously.

Preferably, grinding dust produced during the grinding machining is extracted in order to avoid pollution of the surroundings and to protect the operator from potentially toxic or at least harmful dust.

Advantageously, cooling air bores of the rotor blade to be shortened are sealed or covered before the grinding machining is carried out, as has already been written.

The present invention achieves the object stated in the introduction by further providing a belt grinding apparatus for carrying out the first method variant according to the invention, comprising a motor, at least one grinding belt driven by the motor, a feed/travel device which is configured so as to carry out the feed and travel movement of the grinding belt, an orienting device which is configured so as to orient relative to each other the grinding belt and the rotor blades to be shortened, an extraction device and an attachment device which is configured so as to attach a belt grinding apparatus to a parting joint of a casing of a turbomachine. A belt grinding apparatus of this type is noteworthy in particular in that it can be attached directly to the casing of a turbomachine and can machine rotor blades in situ.

The chosen feed/travel device can for example be a threaded spindle with a trapezoidal thread. Alternatively, recirculating ball screws, other types of thread, toothed racks or the like are also possible. Various linear guides, such as dovetail guides, rolling-bearing linear guides or pneumatically/hydraulically operated cylinders, may be used for guiding. The travel can be measured by means of a scale on the handwheel. A dial gauge is also conceivable. Alternatively, a contactless measurement system, which always measures the real distance to the blade, can be installed. As an emergency solution, however, the rotor and the belt grinding apparatus can be stopped, whereupon the gap can be measured manually using a feeler gauge.

A rotatable plate, for example, which is rotated by hand, can be used as an orienting device. A worm-wheel gearing is also conceivable. Alternatively, however, the orienting device may also be formed integrally with the attachment device in that the attachment device is configured such that the belt grinding apparatus can be attached or adjusted in various positions on the parting joint of the casing, for orientation purposes. Here, too, measurement may be performed by means of a contactless measurement system. Alternatively, it is also possible to scratch manually and then to measure the gap using a feeler gauge.

The extraction device should contain a suitable filter in order to minimize contamination with carcinogenic grinding dust and to reliably prevent dust explosions. It should also be strong enough to keep the cooling bores of the blades free from dust. In addition, the grinding belt can also be largely provided with a shroud which suitably supports the extraction device. Brushes or baffles, which keep the dust in the desired machining region, may be used to protect the blades.

Magnetic clamping plates (mechanically actuated, electrically demagnetized) may be used as attachment device. Also conceivable are multiple small magnet feet (electrically demagnetizable) or clamping pieces, which are screwed to tapped bores formed in the parting joint.

Furthermore, the present invention provides a belt grinding apparatus for carrying out the second method variant according to the invention, in which the rotor blade is machined in the uninstalled state. This belt grinding apparatus comprises a frame, a motor, at least one grinding belt driven by the motor, a feed/travel device which is configured so as to carry out the feed and travel movement of the grinding belt, an orienting device which is configured so as to orient relative to each other the grinding belt and a rotor blade to be shortened, and a quick-release device which is configured to receive the rotor blade and which is attached to a pivot arm held pivotably on the frame.

This belt grinding apparatus also preferably comprises an extraction device.

The feed/travel device, the orienting device and the extraction device may be formed in similar fashion to the first variant according to the invention of the belt grinding apparatus according to the invention.

Further features and advantages of the present invention will become clear from the following description of embodiments according to the invention, with reference to the appended drawing, in which:

BRIEF DESCRIPTION OF THE DRAWINGS

FIGS. 1 and 2 show a belt grinding apparatus according to a first embodiment of the present invention, which serves to shorten a rotor blade 2 of a turbomachine 3 by removal of material at a blade tip, as will be explained in more detail below.

DETAILED DESCRIPTION OF THE EMBODIMENTS OF THE INVENTION

Figure 1:
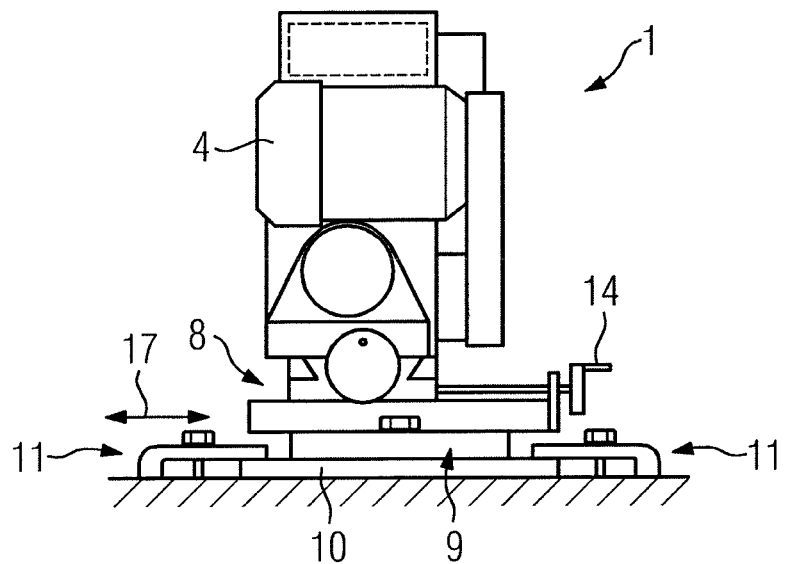
FIG. 1 is a schematic rear view of a belt grinding apparatus according to a first embodiment of the present invention.

The belt grinding apparatus 1 comprises a motor 4, a grinding belt 5 which is driven by the motor 4 and is laid around a contact roller 6 and a tensioning roller 7 and is tensioned between these, a feed/travel device 8 and an orienting device 9, wherein the abovementioned components are arranged on a base plate 10. The belt grinding apparatus 1 further comprises an attachment device 11 by means of which the base plate 10 can be attached to a parting joint 12 of a lower casing half 13 of the turbomachine 3.

The feed/travel device 8 is configured so as to carry out the feed and travel movement of the grinding belt 5 and in the present case is formed by a cross table. With the aid of the feed/travel device 8, the grinding belt 5 may be moved in mutually perpendicular directions by actuating corresponding handwheels 14 and 15, as indicated by the double arrows 16 and 17.

In the present case, the orienting device 9 is formed by a rotatably mounted plate which is rotated by hand and can be secured in any desired rotational position.

The feed/travel device 8 and/or the orienting device 9 can be provided with a contactless measurement system in order to measure the distance to the workpiece to be machined and thus to support the setting of the feed/travel and/or the orientation of the grinding belt 5 with respect to the workpiece.

In the present case, the attachment device 11 is formed by clamping pieces which can be attached to the parting joint 12 via attachment screws and via tapped bores present in the parting joint 12 of the lower casing half 13.

The belt grinding apparatus 1 also comprises an extraction device 18 which, in the present case, is provided as a separate unit. Alternatively, however, it may also be formed integrally with the belt grinding apparatus 1. The extraction device 18 comprises a filter (not shown in more detail) and serves to separate carcinogenic dust and to avoid dust explosions. The extraction device 18 further comprises an extractor fan (not shown in more detail) which is strong enough to entirely or at least almost entirely remove the grinding dust generated during grinding machining.

Figure 3:
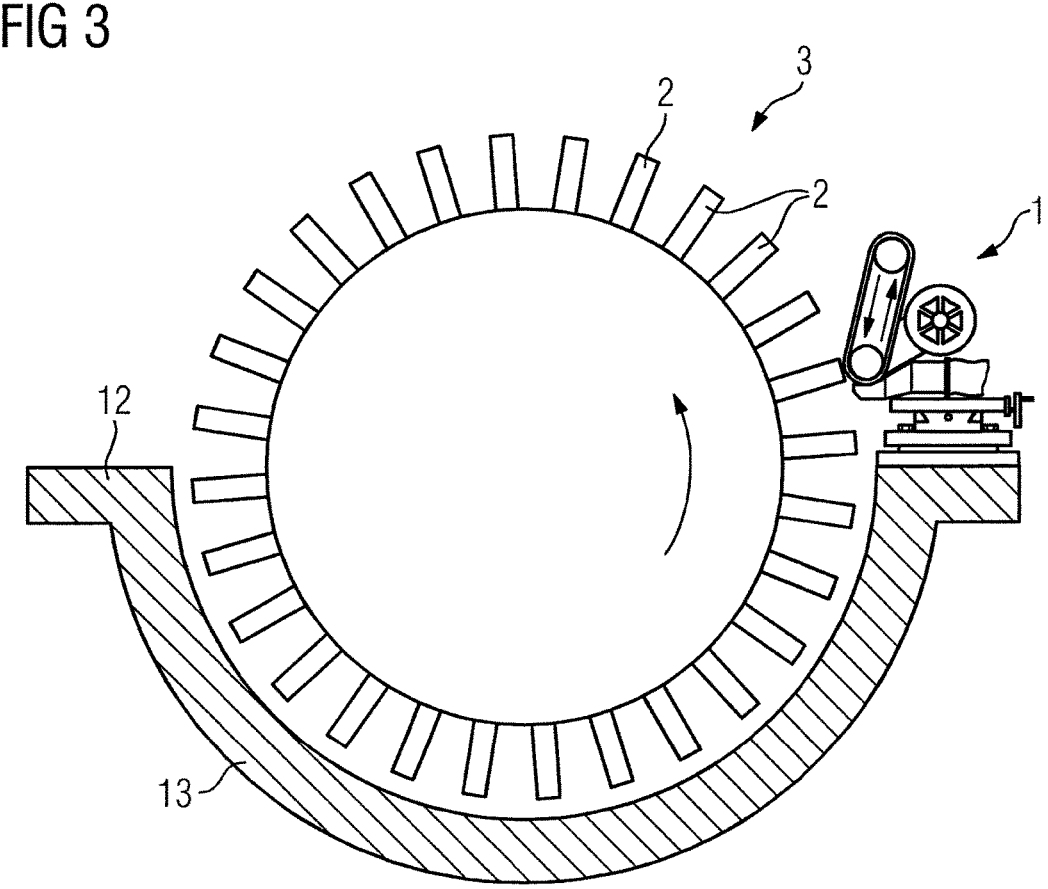
FIG. 3 is a schematic section view showing the belt grinding apparatus represented in FIGS. 1 and 2 in the intended state, during shortening of a rotor blade of a turbomachine.

In order to shorten rotor blades of a turbomachine 3 in the installed state, as shown in FIG. 3, in a first step the upper casing half (not shown) is lifted off and removed, at least partially exposing the rotor blades 2 to be machined and the parting joint 12 of the lower casing half 13. Then, the belt grinding apparatus 1 is attached, using the attachment device 11, to the parting joint 12 of the lower casing half 13 in the region of the rotor blade 2 to be machined. In a further step, the belt grinding apparatus 1 is oriented relative to the rotor blade 2 to be shortened, in that the rotatably mounted plate of the orienting device 9 is rotated and then the rotational position is fixed once the desired orientation is achieved. The rotor blade 2 can now be shortened in situ using the belt grinding apparatus 1 with corresponding actuation of the feed/travel device 8, while the rotor is continuously rotated with the aid of an auxiliary rotor rotating device (not shown in more detail) and the grinding dust produced during the grinding machining is extracted using the extraction device 18. The width of the grinding belt 5 is chosen to be greater than the width of the blade tip, such that in order to shorten the rotor blade 2 it is not necessary to move the grinding belt 5 along the contour of the blade tip. In order to prevent grinding dust leaving the machining region, brushes or baffles, which hold the dust in the desired region, may optionally be used, even if this is not shown in more detail here.

If there is a risk of the extraction device 18 being unable to prevent the cooling air bores of the rotor blades 2 to be shortened from being blocked with grinding dust, the cooling air bores of the rotor blades 2 to be shortened may be sealed or covered before the grinding machining is carried out. The sealing can for example be carried out using wax. An adhesive film or the like, for example, may be used for the covering.

Figure 2:
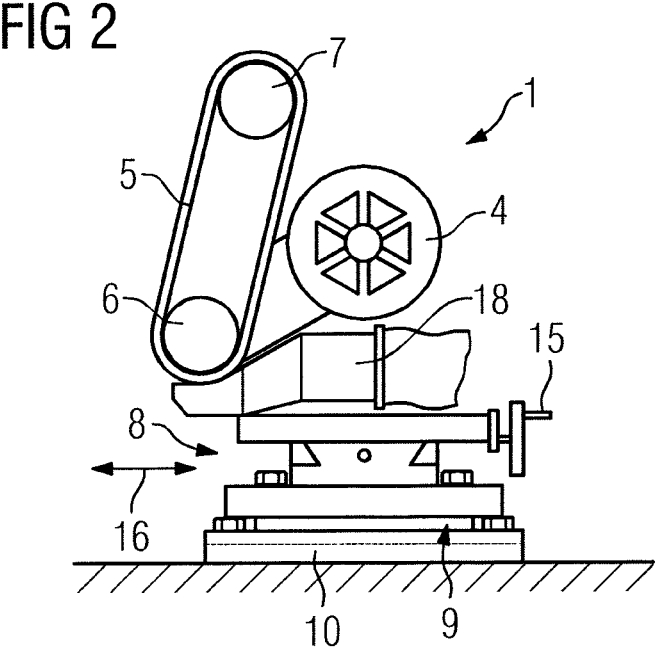
FIG. 2 is a schematic side view of the belt grinding apparatus represented in FIG. 1.

In a further method according to one embodiment of the present invention, rotor blades 2 to be shortened may, in the context of new production or in the context of an overhaul, also be attached to a dummy rotor disk which is then mounted on a rotating device. In that context, the rotating device is configured such that it continuously rotates the dummy rotor disk about its axis of rotation. A belt grinding apparatus, such as a belt grinding apparatus 1 arranged on a frame as shown in FIGS. 1 and 2, can then be oriented with respect to the rotor blades 2 to be shortened, whereupon the rotor blades 2 are shortened as the dummy rotor disk rotates continuously. Also in this variant of the method according to the invention, the grinding dust produced during the grinding machining is extracted, preferably using a corresponding extraction device. In addition, the cooling air bores of the rotor blades to be shortened may also be sealed or covered before the grinding machining is carried out. Alternatively, however, the rotor blades may also simply be cleaned after the shortening.

Figure 4:
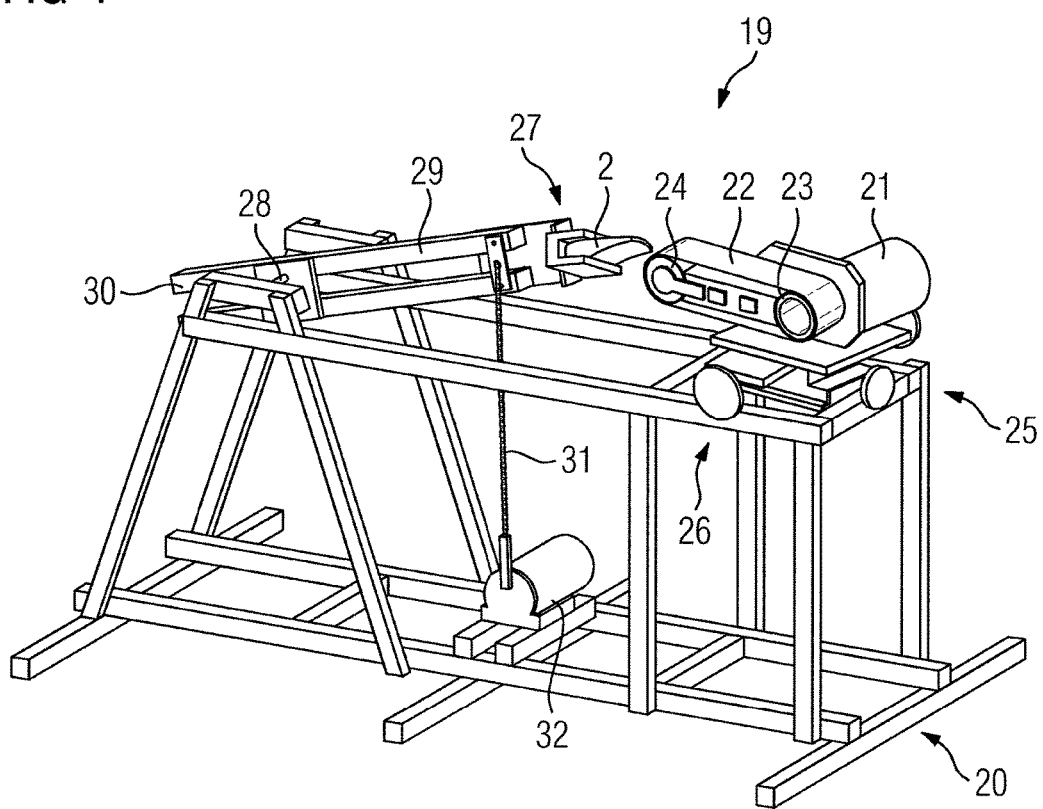
FIG. 4 is a schematic perspective view of a belt grinding apparatus according to a second embodiment of the present invention.

FIG. 4 shows a belt grinding apparatus 19 according to a further embodiment of the present invention, which serves to shorten a rotor blade 2 in the uninstalled state by removal of material at the blade tip. The belt grinding apparatus 19 comprises a frame 20, a motor 21, a grinding belt 22 which is driven by the motor 21 and is laid around a contact roller 23 and a tensioning roller 24 and is tensioned between these, a feed/travel device 25 which is configured so as to carry out the feed and travel movement of the grinding belt 22, a configuring device 26 which is configured so as to orient relative to each other the grinding belt 22 and a rotor blade 2 to be shortened, and a quick-release device 27 which is configured to receive the rotor blade 2 and which is attached to a pivot arm 29 held pivotably about a pivot axis 28 on a frame 20, and which is provided with a counterweight 30 at its free end. The pivot arm 29 is connected, via an articulated adjustable-length rod 31, to a drive 32 which produces the lifting movement of the pivot arm 29 and which is mounted on the frame 20.

The belt grinding apparatus 19 can also be equipped with an extraction device 18, if this is desired, even though such an extraction device 18 is not shown in FIG. 4.

The feed/travel device 25, the orienting device 26 and the extraction device 18 may be formed in similar fashion to the corresponding components of the belt grinding apparatus 1 represented in FIGS. 1 to 3, and will therefore not be described anew here.

In order to shorten a rotor blade 2, this is removed from the turbomachine 3 in a first step. The rotor blade 2 is then attached to the quick-release device 27 of the belt grinding apparatus 19. In a further step, the grinding belt 22 is oriented relative to the rotor blade 2 by means of the orienting device 26. Thereupon, the rotor blade 2 is shortened using the belt grinding apparatus 19 while the quick-release device 27, together with the rotor blade 2 attached thereto, is pivoted about the pivot axis 28 by means of the drive 32. The grinding particles produced during the grinding machining can be extracted by the extraction device, if such a device is present.

In the case of this variant according to the invention, too, the cooling air bores of the rotor blade 2 to be shortened can be sealed or covered before the grinding machining is carried out, as has already been described with reference to the first method variant. However, it is also possible to use barrier air which flows from inside the blade through the cooling air bores and thus prevents the bores being blocked. Alternatively or in addition, the rotor blade 2 may simply be cleaned after it has been machined.

An essential advantage of the belt grinding apparatuses 1 and 19 according to the invention, and of the methods, carried out using these, for shortening rotor blades of a turbomachine by removal of material at the blade tip, resides in the fact that by using a grinding belt which is wider than the blade tip to be shortened, the entire blade tip can be machined in one pass. Accordingly, in contrast to grinding machining using a grinding disk and in contrast to milling machining, it is not necessary to move the grinding belt along the contour of the blade tip, which results in a compact, lightweight and cost-effective construction. In addition, the machining time is decisively reduced. A further advantage of using a belt grinding apparatus is that grinding belts are not as susceptible to transport damage as straight grinding disks and milling cutters. Furthermore, tests have shown that, when using a belt grinding apparatus, there is no risk of the ceramic coating of the blades breaking off. In addition, grinding machining with a grinding belt generates no or almost no burrs, which has the advantage that no or only limited manual post-treatments need be carried out. Yet a further advantage is that with the reduced machining time also comes a reduced hazard period for staff.

What is claimed is:

1. An apparatus and a turbomachine, the apparatus configured for shortening at least one rotor blade of the turbomachine by grinding a blade tip of the at least one rotor blade of the turbomachine, the apparatus and the turbomachine comprising:
   a casing of the turbomachine;
   only one blade tip grinding device of the apparatus comprising only one grinding belt, only one contact roller, and only one tensioning roller, the only one grinding belt running around the only one contact roller and the only one tensioning roller, the blade tip grinding device being positioned at the casing;
   a rotor of the turbomachine, the rotor being installed in the casing, the rotor being configured for supporting rotor blades on the rotor and oriented for the blades to extend outwardly from the rotor, wherein each supported blade has a tip extending outwardly from the rotor so as to be ground by the grinding device;
   an opening into the casing formed by removing an upper half of the casing, the opening extending a distance around the rotor and a lower half of the casing to allow access by the grinding device to the tips of the rotor blades as the rotor blades on the rotor rotate past the opening in the casing and past the grinding device;
   a support surface of the lower half of the casing at the opening, the grinding device being supported on the lower half of the casing at the support surface of the lower half of the casing, the grinding device being positioned to cause the grinding device to extend to the tips of the rotor blades moving past the grinding device for causing the grinding device to grind the tips of the blades;
   an orienting device of the apparatus located and configured for orienting the rotor blade tips and the grinding device with respect to each other so that when the grinding device is grinding the tips rotating past, the grinding device grinds the tips of the rotor blades in a selected manner; and
   an attachment device of the apparatus configured to attach the blade tip grinding device at a location on the lower half of the casing at the opening in the casing so that the blade tips are rotated by the rotor past the grinding device at the opening in the casing for the grinding device to grind the blade tips,
   wherein each supported blade is ground by the grinding device while the rotor and the rotor blades remain installed in the casing of the turbomachine.

2. The apparatus and the turbomachine of claim 1, wherein the opening in the casing is configured to define a parting joint of the casing at the opening and the blade tip grinding device is attached to the lower half of the casing at the parting joint of the casing.

3. The apparatus and the turbomachine of claim 1, wherein the grinding device in the opening in the casing is movable past the blade tips for grinding the blade tips as they are rotated past the grinding device.

4. The apparatus and the turbomachine of claim 3, wherein the grinding device further comprises a guide and support for moving the grinding belt past the blade tips for grinding the blade tips as the blade tips rotate past the grinding belt.

5. The apparatus and the turbomachine of claim 1, further comprising a grinding dust extraction device configured and located for extracting grinding dust produced during the grinding of the blade tips.

6. The apparatus and the turbomachine of claim 5, wherein the extraction device comprises an extraction fan operable and of such strength as to remove the grinding dust generated during grinding.

7. The apparatus and the turbomachine of claim 5, wherein the extraction device comprises a filter for filtering dust out of air that is extracted from the casing during the grinding of the blade tips.

8. The apparatus and the turbomachine of claim 1, wherein the casing is arcuate in shape around the rotor and the casing has a parting line defined by ends of the arcuate shape, and the blade tip grinding device is attached to the lower half of the casing at the parting line.

9. The apparatus and the turbomachine of claim 8, wherein the grinding device further comprises a guide and support for moving the grinding belt past the blade tips for grinding the blade tips as the blade tips rotate past the grinding belt.

* * * * *